Patented Sept. 1, 1936

2,052,745

UNITED STATES PATENT OFFICE 2,052,745

PROCESS OF REFINING ANETHOL

Carlisle H. Bibb, Pensacola, Fla., assignor to Newport Industries, Inc., Pensacola, Fla., a corporation of Delaware No Drawing. Application December 4, 1935, Serial No. 52,810

9 Claims. (Cl. 260—150)

This invention relates to a process for producing a substantially pure and stable synthetic anethol from crude anethol.

More specifically this invention relates to a process for refining the anethol produced by isomerizing methyl chavicol in the presence of a caustic alkali.

In my copending application, Serial No. 52,809, entitled "Process of isomerizing methyl chavicol", filed of even date herewith I have described a method of converting methyl chavicol into anethol in the presence of finely divided caustic alkali.

I have now found that the anethol so produced is similar to other commercial forms of synthetic anethol in that it contains small amounts of acidic and phenolic compounds such as anol which are extremely difficult to separate from the anethol by fractional distillation. The presence of these substances is a detriment to the quality of anethol because of their odor and taste and particularly because they make the anethol unstable.

I have also found that these acidic and phenolic compounds accelerate the rate of polymerization of the anethol. For example when anethol containing these impurities was exposed to the air, polymerization took place and in a few minutes crystals of the polymer could be seen. Even after subjecting the anethol to a very carefully controlled fractional distillation these undesirable constituents were still present in enough concentration to be objectionable.

I have now found that the successive washing of synthetic anethol such as is prepared by the isomerization of methyl chavicol, with dilute alkaline solutions removes these impurities and that the alkali can be removed by successive washings with water.

It is therefore an object of this invention to refine synthetic anethol and produce a product free from acidic and phenolic impurities.

Another object of this invention is to remove impurities, which cannot be separated by fractional distillation, from synthetic anethol.

A specific object of this invention is to purify anethol prepared by the isomerization of methyl chavicol by washing the isomerized product with dilute alkaline solutions and removing the alkali by successive washings with water.

Another object of this invention is to prepare substantially pure anethol in a stable form.

Other and further objects of this invention will be apparent from the following detailed description and appended claims which form a part of this specification.

The following example illustrates a preferred embodiment of the invention, it being understood that the invention is not limited to the specific materials and proportions indicated.

Example 372 gallons of crude synthetic anethol prepared by the alkali isomerization of methyl chavicol are washed with 100 gallons of dilute sodium hydroxide solution of about 7% concentration. This is followed by three more washes of 50 gallons each of similar sodium hydroxide solution. The resulting product is then washed five times with 100 gallons of water each time. Thus the impurities which react with or dissolve in sodium hydroxide solution are removed, even though partial extraction is only possible with one wash. Any sodium hydroxide remaining is washed out by water, otherwise upon heating to temperatures sufficient to distill the anethol the sodium hydroxide would generate more phenolic compounds according to the following equation.

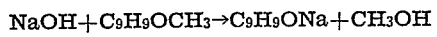

$$NaOH + C_9H_9OCH_3 \rightarrow C_9H_9ONa + CH_3OH$$

A high quality of synthetic anethol is thus produced which has a pure taste and odor and does not polymerize when exposed to air. The number of washes of both sodium hydroxide and water can be reduced somewhat if their volumes are materially increased.

If desired the step of distilling the crude anethol may optionally precede or follow the washes with alkali and water if a water white product is desired.

In place of the sodium hydroxide as an alkaline wash I may use any other aqueous solution of a caustic alkali such as for example aqueous solutions of potassium hydroxide, or lithium hydroxide.

From the above description it should be understood that I have prepared a simplified and efficient process for refining crude anethol to produce a stable synthetic anethol product free from acidic and phenolic compounds.

The concentrations of the alkaline solutions used for the washing steps may vary within wide limits although the use of dilute solutions containing not more than 20% alkali is desirable.

I am aware that numerous details of the process may be varied through a wide range without departing from the principles of this invention, and I, therefore, do not purpose limiting the patent granted hereon otherwise than necessitated by the prior art.

I claim:

1. The process of purifying anethol which comprises washing crude anethol obtained by the isomerization of methyl chavicol with a caustic alkali solution.

2. The process of purifying crude synthetic anethol prepared by the alkali isomerization of methyl chavicol which comprises successively washing the crude anethol with aqueous solutions of caustic alkali and removing any alkali from the anethol by repeated washings with water.

3. The step of purifying crude anethol prepared by the alkali isomerization of methyl chavicol which comprises successively washing the crude anethol with aqueous solutions of a caustic alkali.

4. The step in the process of purifying crude anethol obtained by the isomerization of methyl chavicol which comprises successively washing the crude anethol with dilute caustic alkali solutions.

5. In the process of purifying crude anethol obtained by the isomerization of methyl chavicol by repeated washing with an alkaline solution, the step which comprises removing the alkali by repeated washings of the anethol with water.

6. A process of purifying crude anethol prepared by the alkali isomerization of methyl chavicol which comprises successively washing the crude anethol with dilute caustic alkali solutions, extracting any remaining alkali in the anethol with water and distilling the washed anethol to recover a stable, purified product.

7. The process of purifying crude anethol prepared by the alkali isomerization of methyl chavicol which comprises distilling the crude anethol, successively washing the distilled anethol with dilute caustic alkali solutions and following said alkali washes with successive washes with water.

8. A process of purifying crude anethol prepared by the alkali isomerization of methyl chavicol which comprises distilling the crude anethol, successively washing the distilled anethol with dilute sodium hydroxide solutions until acid and phenolic materials are substantially removed and following said alkaline washes with successive washes with water until the alkali is substantially removed from the anethol.

9. A process of purifying crude anethol obtained by the isomerization of methyl chavicol which comprises successively washing the crude anethol with caustic alkali solutions until the acid and phenolic materials are substantially removed, extracting any occluded or dissolved alkali from the anethol with water and distilling the anethol to recover a pure stable product.

CARLISLE H. BIBB.